United States Patent
Doyle

(10) Patent No.: US 10,741,803 B2
(45) Date of Patent: Aug. 11, 2020

(54) BATTERY COVER FOR RETENTION OF DIELECTRIC FLUID

(71) Applicant: Doyle Manufacturing, Inc., Holland, OH (US)

(72) Inventor: Michael A. Doyle, Holland, OH (US)

(73) Assignee: DOYLE MANUFACTURING, INC., Holland, OH (US)

(*) Notice: Subject to any disclaimer, the term of this patent is extended or adjusted under 35 U.S.C. 154(b) by 145 days.

(21) Appl. No.: 16/129,963

(22) Filed: Sep. 13, 2018

(65) Prior Publication Data

US 2019/0081287 A1 Mar. 14, 2019

Related U.S. Application Data

(60) Provisional application No. 62/558,042, filed on Sep. 13, 2017.

(51) Int. Cl.
| | |
|---|---|
| H01M 2/04 | (2006.01) |
| H01M 2/08 | (2006.01) |
| H01M 2/12 | (2006.01) |
| H01M 10/0563 | (2010.01) |
| H01M 10/6569 | (2014.01) |
| H01M 10/48 | (2006.01) |

(52) U.S. Cl.
CPC ........... *H01M 2/04* (2013.01); *H01M 2/1205* (2013.01); *H01M 2/1223* (2013.01); *H01M 10/0563* (2013.01); *H01M 10/6569* (2015.04); *H01M 2/08* (2013.01); *H01M 10/484* (2013.01)

(58) Field of Classification Search
CPC ...... H01M 2/04; H01M 10/0563; H01M 2/02; H01M 2/12; H01M 10/6569
See application file for complete search history.

(56) References Cited

U.S. PATENT DOCUMENTS

| | | | | |
|---|---|---|---|---|
| 3,093,516 A | * | 6/1963 | Hennen | H01M 10/484 429/57 |
| 3,899,358 A | * | 8/1975 | Sundberg | H01M 2/1205 429/175 |
| 4,075,399 A | * | 2/1978 | Sabatino | H01M 2/1205 429/48 |
| 8,999,565 B2 | | 4/2015 | Doyle | |
| 2009/0202902 A1 | * | 8/2009 | Doyle | H01M 2/043 429/175 |

* cited by examiner

*Primary Examiner* — Kenneth J Douyette
(74) *Attorney, Agent, or Firm* — Shumaker, Loop & Kendrick, LLP; James D. Miller

(57) ABSTRACT

A battery cover includes a sealing member configured to provide a fluid-tight sealing member with a battery casing. The sealing member has a top surface and a bottom surface. A vent aperture is formed through the sealing member. A condensation chamber is disposed adjacent the bottom surface of the sealing member and is fluidly coupled to the vent aperture via an outlet. The condensation chamber receiving a flow of a fluid therethrough.

20 Claims, 7 Drawing Sheets

BATTERY COVER FOR RETENTION OF DIELECTRIC FLUID

CROSS-REFERENCE TO RELATED PATENT APPLICATION

This patent application claims the benefit of U.S. Provisional Patent Application Ser. No. 62/558,042, filed on Sep. 13, 2017. The entire disclosure of the above patent application is hereby incorporated herein by reference.

FIELD

The present technology relates to a battery and, more particularly, to a battery construction for increasing a useful life thereof through use of a battery cover which provides a means for collecting drops of electrolyte entrained in the gases produced within the battery and returning the electrolyte to one or more cells of the battery.

BACKGROUND

Various electric storage batteries include ways to capture electrolyte vapor, including various filter cap structures that separate and return droplets of electrolyte to a main source while allowing a discharge of internally produced gases. During operation of various types of batteries, including lead-acid batteries, gases can be produced within an interior of the batteries. More specifically, such batteries can include a casing or jar containing multiple battery cells, each of which contains an anode and a cathode separated by a plate and immersed in an electrolyte. A pair of terminals can be coupled to the respective anodes and cathodes of the multiple battery cells. Operation of the battery can generate gases from chemical reactions taking place within the battery. These gases can entrap and entrain electrolyte and carry the electrolyte out of the respective cells of the battery, which can be detrimental to battery performance and can shorten the effective operating life of the battery.

While it would be ideal to solve the above problem by completely sealing the battery, sealing the battery in certain applications can be impossible due to a pressure of the gases developed within certain batteries. Internal pressure can require that the battery is effectively vented to accommodate the gases generated within the battery. Without proper ventilation, pressures can rise to levels that may damage the battery.

Various means exist to minimize the loss of electrolyte from batteries. Vented filter caps and battery covers are used to overcome the above problem with varying degrees of success. One such type of filter cap can be configured in the form of a hollow cylinder with small holes in upper and lower circular faces. The interior of the cylinder can be filled with small spheres. Droplets of electrolyte thereby condense on the outer surface of the spheres as gases are directed through the cylinder and are collected to form larger drops, which then are directed back into the battery cell. Other attempts to address escaping electrolyte, due to overloading of such filter caps, include certain battery covers as set forth in U.S. Pat. No. 8,999,565 to Doyle, the disclosure of which is hereby incorporated herein by reference in its entirety. These battery covers can increase battery life by having a lid addition integral with the battery case or jar that condenses escaping dielectric fluid and causes the condensed liquid to return to the main supply of dielectric fluid.

Despite such advances, battery design goals are still focused on optimizing battery performance by permitting a discharge of gases generated within a battery while maximizing the retention of electrolyte therein. For example, it is desired for an entirety of the gases to flow through a condensation chamber for condensing electrolyte instead of just a portion of the gases flowing through an area for condensation. It is also desired to optimize a surface area of a medium through which the gas flows to optimize condensation of the electrolyte and retention of the electrolyte within the battery. By maximizing electrolyte retention in this manner, maintenance of the battery is reduced and effective lifespan is increased.

Accordingly, there exists a need in the art for an improved battery cover which minimizes a loss of electrolyte resulting from gas discharge from one or more battery cells.

SUMMARY

In accordance and attuned with the present invention, an improved battery cover which minimizes a loss of electrolyte resulting from discharge from one or more batter cells has surprisingly been discovered.

The present technology includes articles of manufacture, systems, and processes that relate to battery covers and batteries employing such that minimize a loss of electrolyte resulting from gas discharge from one or more battery cells.

According to an embodiment of the invention, a battery cover includes a sealing member configured to provide a fluid-tight sealing with a battery casing. The sealing member has a top surface and a bottom surface. A vent aperture is formed through the sealing member. A condensation chamber is disposed adjacent the bottom surface of the sealing member and fluidly coupled to the vent aperture via an outlet. The condensation chamber receives a flow of a fluid therethrough.

According to another embodiment of the invention, a battery cover is disclosed. The battery cover includes a sealing member configured to provide a fluid-tight seal with the battery casing. The sealing member has a top surface, a bottom surface, a vent aperture formed therethrough, and a terminal aperture formed therethrough. An inner vent wall surrounds the vent aperture and extends outwardly from the bottom surface of the sealing member. An inner chamber wall extends outwardly from the bottom surface of the sealing member. The inner chamber wall defines a condensation chamber fluidly coupled to the vent aperture via an outlet. The condensation chamber conveys a flow of a fluid therethrough. A medium is disposed within the condensation chamber.

According to yet another embodiment of the invention, a method of retaining electrolyte in a battery is disclosed. The method includes the following steps: sealing a battery casing containing the battery with a battery cover; venting gases released by the battery through a vent aperture formed through the battery cover; condensing electrolyte entrained within the gases in a condensation chamber disposed on the battery cover before the gasses exit through the vent aperture, the condensation chamber fluidly coupled to the vent aperture, the gases contacting a surface area of a medium disposed within the condensation chamber; and determining a size of the surface area of the medium dependent on the amount of electrolyte necessitating retainment within the battery.

DRAWINGS

The drawings described herein are for illustrative purposes only of selected embodiments and not all possible implementations, and are not intended to limit the scope of the present disclosure.

DETAILED DESCRIPTION

Figure 1:
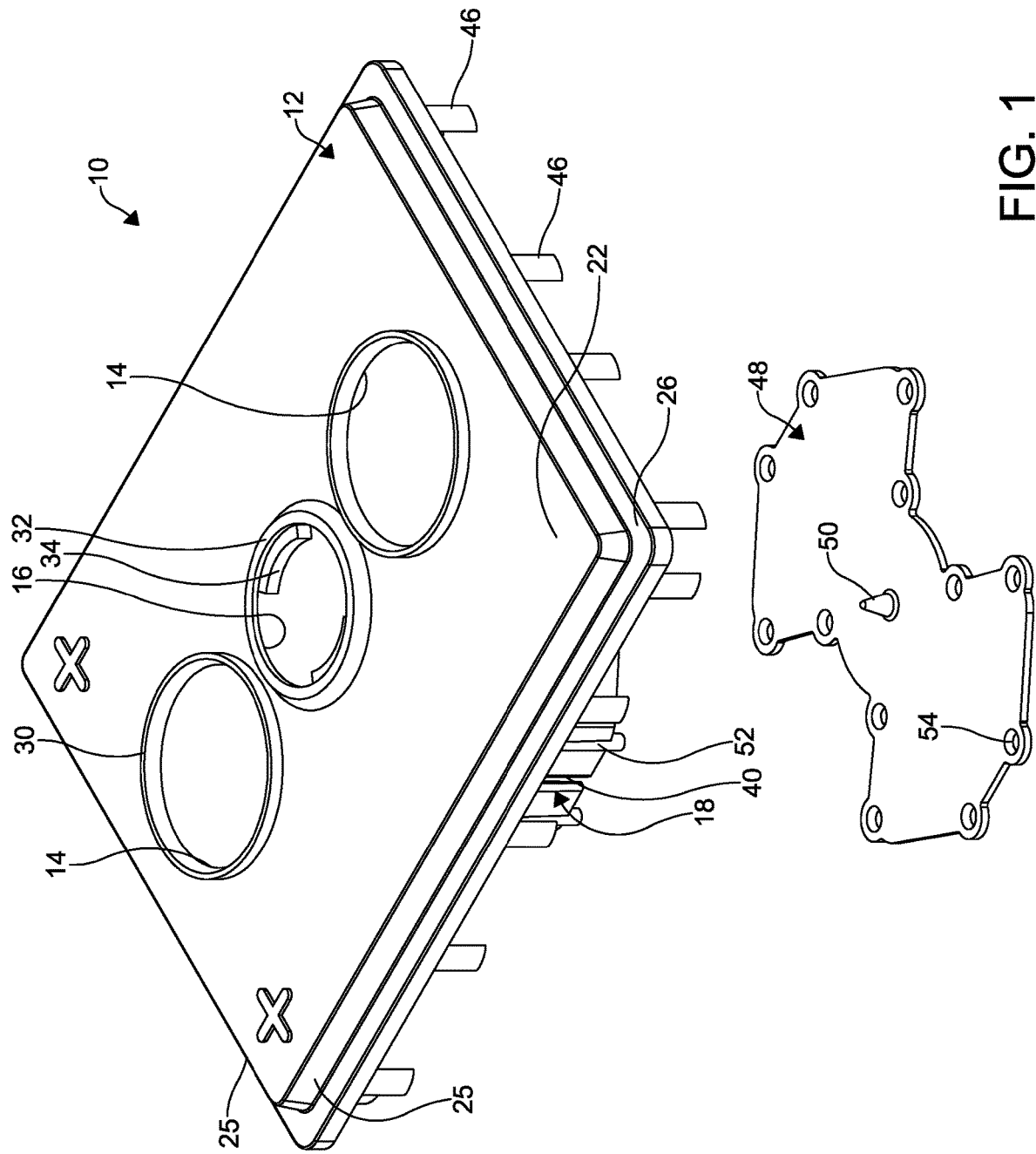
FIG. 1 illustrates an exploded top perspective view of a battery cover according to an embodiment of the disclosure.
Figure 2:
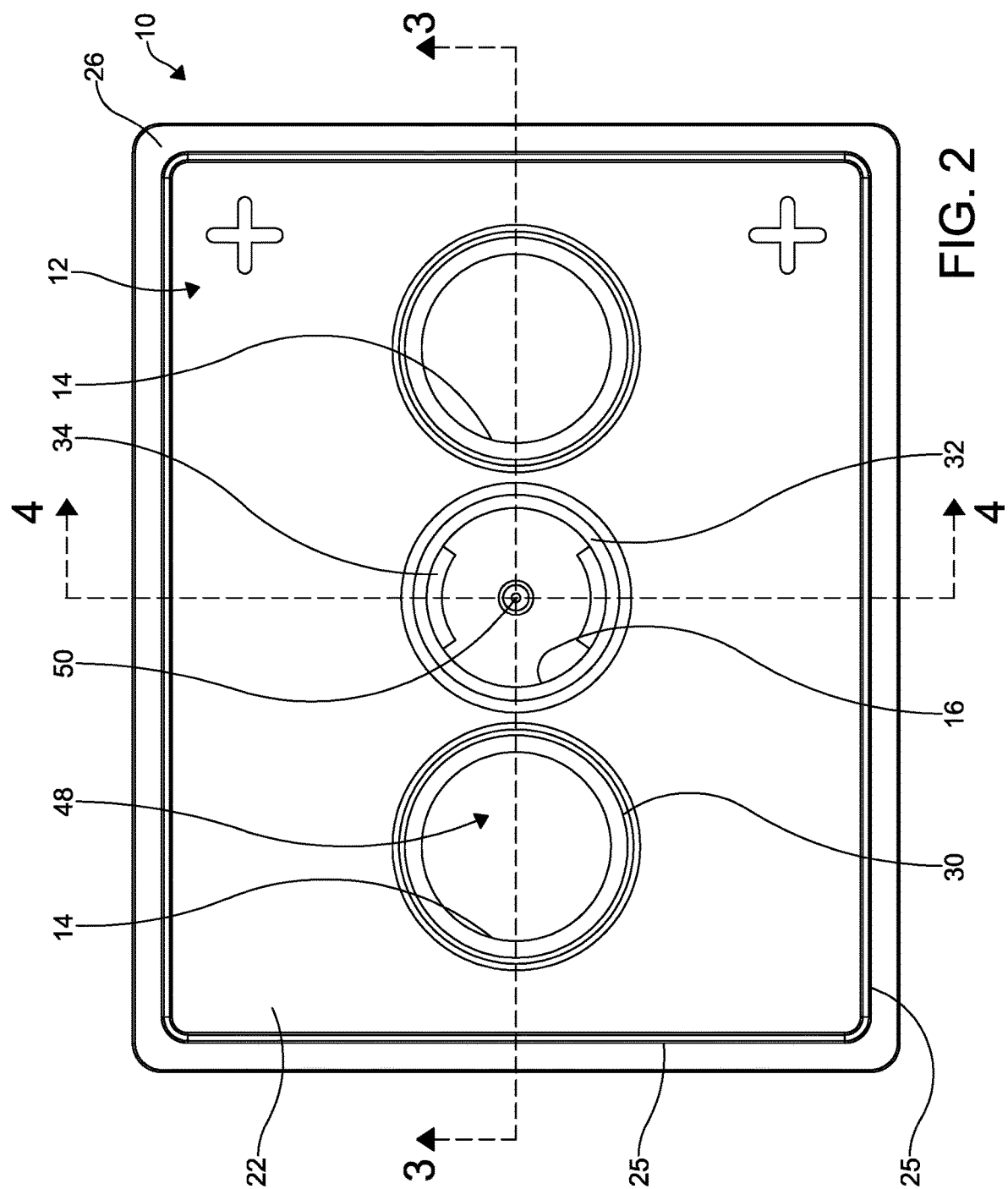
FIG. 2 illustrates a top plan view of the batter cover of FIG. 1.
Figure 3:
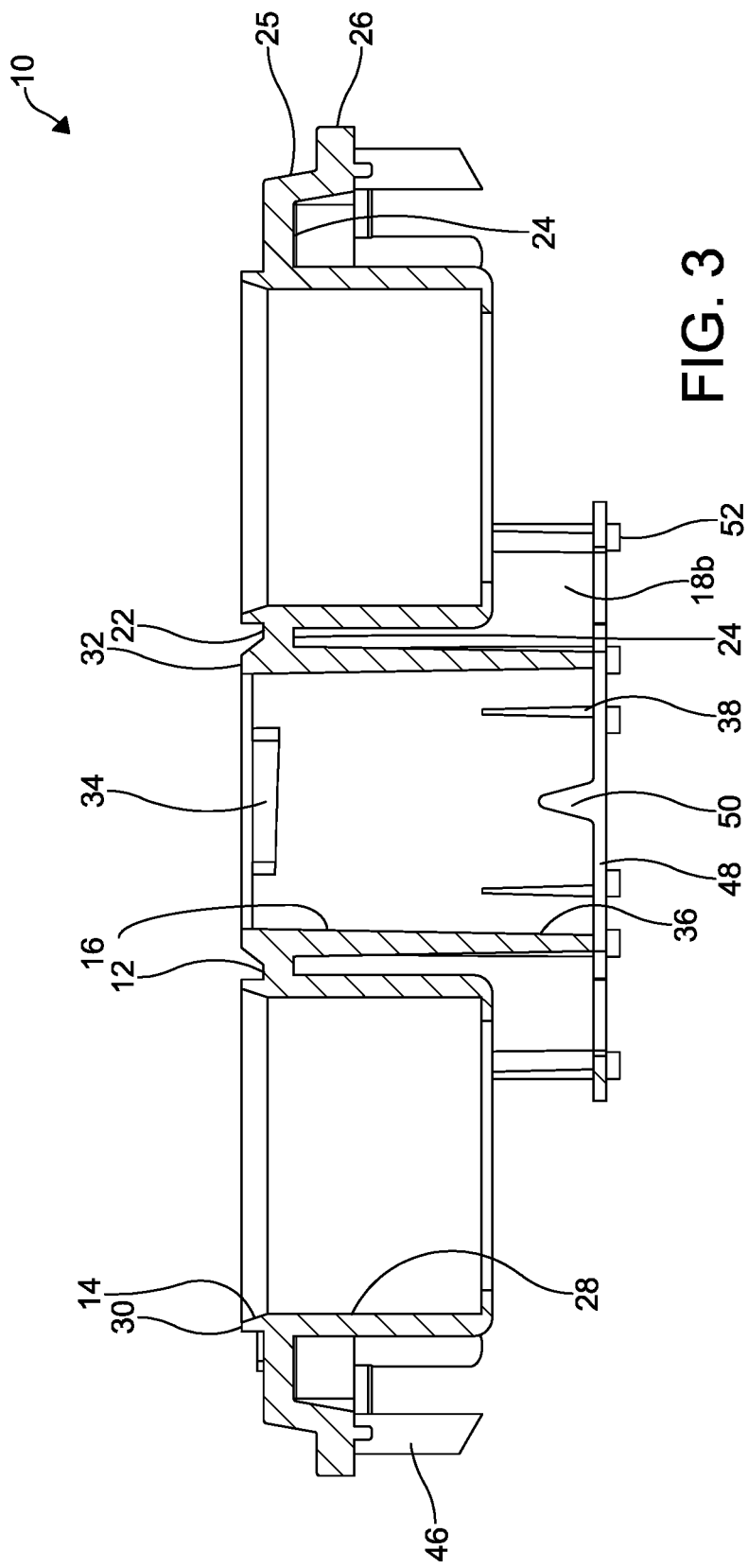
FIG. 3 illustrates a cross-sectional elevational view of the battery cover of FIG. 2, taken through line 3-3.

The following description and appended drawings is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "top," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-5 illustrate a battery cover 10 of a storage battery according to an embodiment of the disclosure. The battery cover 10 is configured for coupling to a battery jar or battery case (not shown) of the battery. The battery case includes a plurality of cooperating anodes and cathodes separated by a battery plate which in cooperation with respective positive and negative terminals and an appropriate liquid electrolyte form a battery cell. As illustrated, the battery cover 10 is configured for a battery containing two cells. However, it is understood, the battery cover 10 can be configured for containing fewer than or greater than two cells, without departing from the scope of the present disclosure.

The battery cover 10 includes a sealing member 12, terminal apertures 14, a vent aperture 16, a condensation chamber 18, and a medium 44. The sealing member 12 can be configured to provide a fluid-tight sealing member with the battery case, wherein the sealing member 12 can define a sealing membered portion of the battery cover 10 when coupled to the battery case. The sealing member 12 shown is substantially rectangular in cross-sectional shape to correspond to a shape of the battery casing. However, the sealing member 12 can be any shape to correspond to the shape of the battery casing. The sealing member 12 includes a top surface 22, an opposing bottom surface 24, and an outer wall 25 extending outwardly from and surrounding the bottom surface 24. A flanged portion 26 extends laterally outwardly from the side walls 25 about the perimeter of the sealing member 12. In the embodiment shown, the flanged portion 26 is configured to engage the battery casing when the battery cover 10 is coupled to the battery casing.

Each of the terminal apertures 14 includes a rim 30 and is formed through the sealing member 12 to receive a positive terminal or a negative terminal (not shown) attached to the anodes and the cathodes of the battery. As shown, two terminal apertures 14 are illustrated for convenience. However, it is understood more than two terminal apertures 14 or fewer than two terminal apertures 14 can be formed in the sealing member 12 depending on the number of battery cells in the battery. An inner terminal wall 28 surrounds each of the terminal apertures 14 and extends outwardly from the bottom surface 24 of the sealing member 12.

As shown, the vent aperture 16 is formed through the sealing member 12 at a center portion of the sealing member 12. The vent aperture 16 is also centrally disposed with respect to the terminal apertures 14. However, it is understood other structural arrangements of the vent aperture 16 with respect to the terminal apertures 14 can be contemplated as desired, depending on the number of battery cells in the battery. For example, the vent aperture 16 can non-centrally disposed or offset from one or more of the terminal apertures 14. The vent aperture 16 includes a rim 32 and a coupling feature 34 formed on an inner surface of an inner vent wall 36 surrounding the vent aperture 16. The inner vent wall 36 extends outwardly from the bottom surface 24 of the sealing member 12. The coupling features 34 are configured for coupling to a vent cap (not shown) for sealing the vent aperture 16. The vent cap is capable of releasing a fluid, such as gases produced by the battery, from the battery. For example, the vent cap may be a bayonet-style standard or safety vent cap, WATER MISER® vent cap manufactured by Doyle Manufacturing, Inc., or any other vent cap now known or later developed. As illustrated, the coupling features 34 are bayonet tabs configured to cooperate with bayonet tabs of the vent caps. However, it is understood the coupling features 34 can be non-bayonet style coupling features such as internal threads, detents, key slots, or any other coupling feature, as desired, depending on the type of the vent cap coupled to the battery cover 10. A height of the inner vent wall 36 is greater than the height of the inner terminal walls 28.

The condensation chamber 18 is in fluid communication with the vent aperture 16 via an outlet 38 and in fluid communication with an interior of the battery casing via an inlet 40. The fluid or gases released from the battery are conveyed through the condensation chamber 18. The gases released from the battery can include entrained electrolyte in the form of vapor, although it is understood the condensation chamber 18 can receive other fluids or gases as desired. The condensation chamber 18 is formed on the bottom surface 24 or interior side of the battery cover 10. The condensation chamber 18 is defined by an inner chamber wall 42 extending outwardly from the bottom surface 24 of the sealing member 12. The inner chamber wall 42 does not surround any of the terminal apertures 14. The inner chamber wall 42 can be integrally formed with the inner vent wall 36 or separately formed from the inner vent wall 36.

As illustrated, the condensation chamber 18 is divided into a first condensation chamber 18a and a second condensation chamber 18b extending from diametrically opposed portions of the vent aperture 16. In this way, the gases generated in different regions of the battery can pass through different ones of the condensation chambers 18a, 18b positioned in differing locations within the battery casing. It is understood the condensation chamber 18 can be divided into more than the two condensation chambers 18a, 18b, if desired. Each of the condensation chambers 18a, 18b has a polygonal cross-sectional shape. For example, as shown, each of the condensation chambers 18a, 18b has a substantially irregular hexagonal cross-sectional shape, wherein some of the corners are rounded. It is understood, each of the condensation chambers 18a, 18b can have any shape or configuration as desired. For example, each of the condensation chambers 18a, 18b can have a substantially ovular or circular cross-sectional shape, a substantially oblong cross-sectional shape, or any other shape as desired.

The inlet 40 is configured as a plurality of elongate slots formed in the inner chamber wall 42 for receiving gases from the battery casing. The inlet 40 is formed at outermost opposing widthwise ends of the inner chamber wall 42. In the embodiment illustrated, three slots are formed in the inner chamber wall 42 defining the first condensation chamber 18a and three slots are formed in the inner chamber wall 42 defining the second condensation chamber 18b to form the inlet 40, for a total of six slots. However, it is understood more than or fewer than six slots can be formed in the inner chamber wall 42 forming the condensation chambers 18a, 18b, if desired. Additionally, the inlet 40 can be configured as at least one aperture or a plurality of apertures with any shapes, if desired. The inlet 40 can also enable retained condensed electrolyte to flow from the condensation chambers 18a, 18b to the battery casing.

The outlet 38 is configured as plurality of slots formed in the inner vent wall 36 for receiving gases from the respective ones of the condensation chambers 18a, 18b. In the embodiment illustrated, the outlet 38 is configured as six slots, wherein three slots are in direct fluid communication with each of the condensation chambers 18a, 18b. However, it is understood, the outlet 38 can include more than four slots or fewer than four slots. Additionally, the outlet 38 can be configured as a least one aperture or a plurality of apertures with any shape, if desired.

Figure 4:
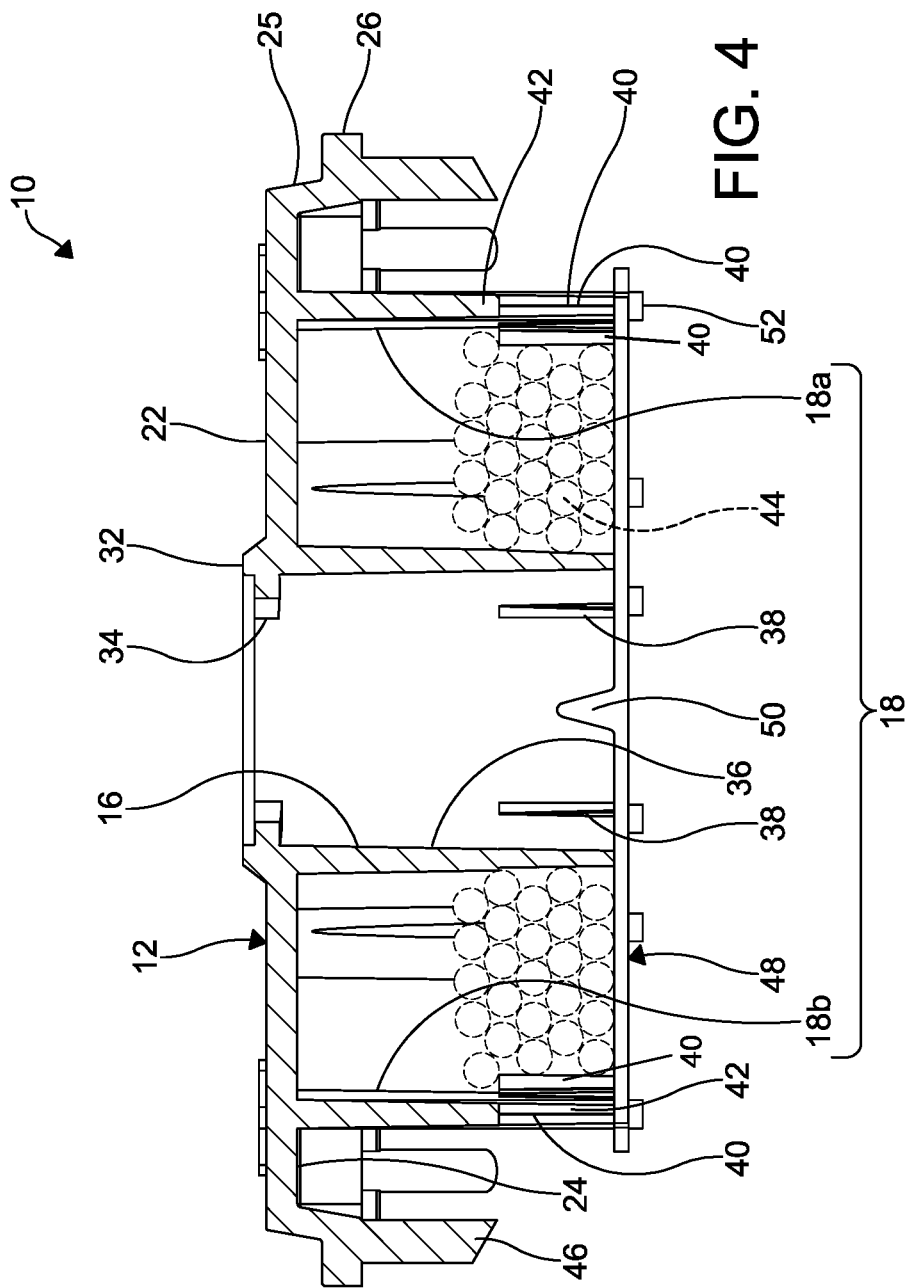
FIG. 4 illustrates a cross-sectional elevational view of the battery cover of FIG. 2, taken through line 4-4.
Figure 5:
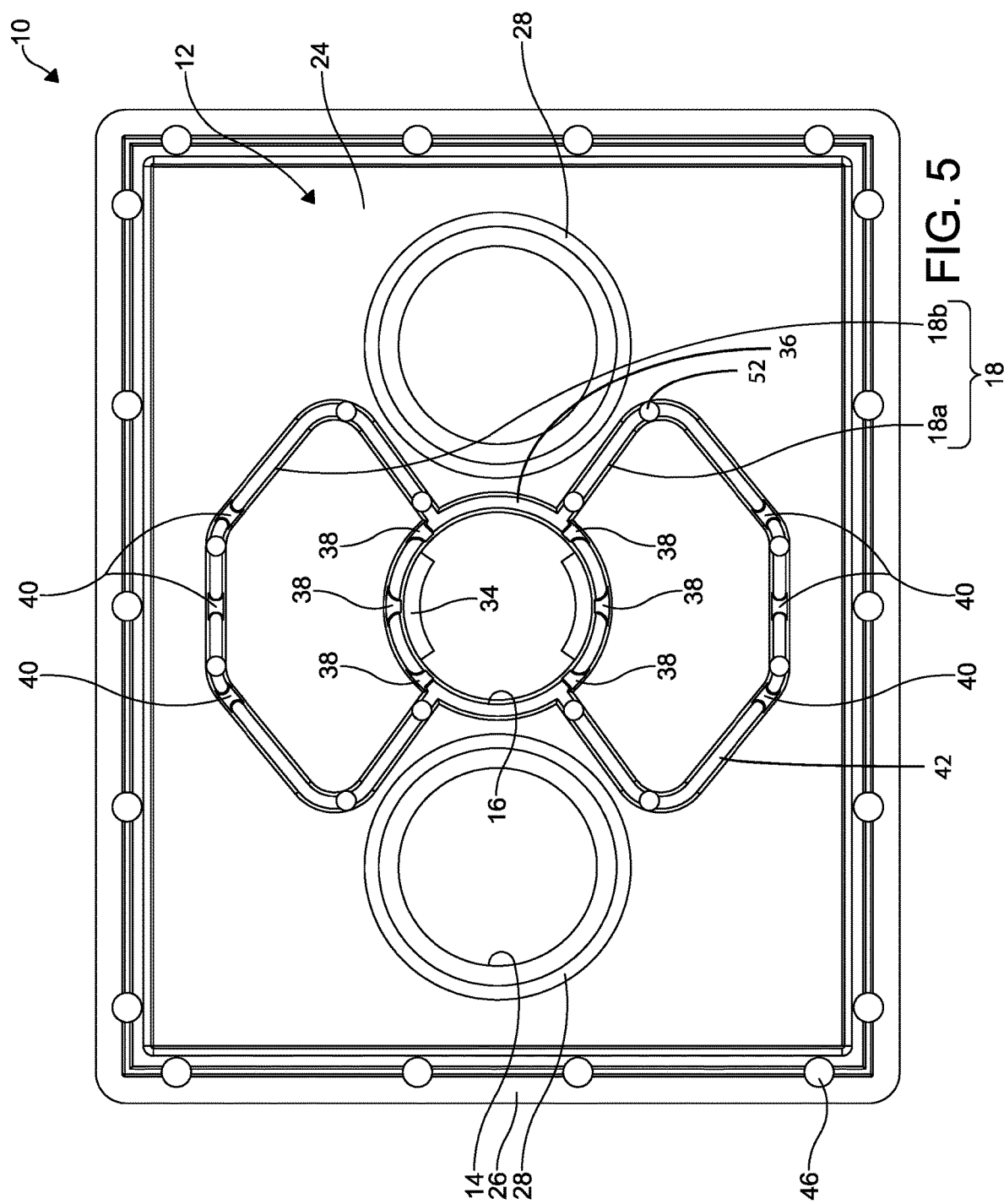
FIG. 5 illustrates a bottom plan view of the battery cover of FIG. 1 with a lid removed therefrom.

As shown in FIG. 4, a medium 44, schematically represented by dashed lines, can be included within each of the condensation chambers 18a, 18b, wherein the medium 44 provides a desired surface area contacted by the gases flowing from the inlet 40, through the condensation chambers 18a, 18b, to the outlet 38. In the embodiment illustrated, the medium 44 can include a plurality of particles or a plurality of pellets. The medium 44 substantially increases a surface area available for electrolyte condensation to occur within the condensation chambers 18a, 18b. The size and/or number of the particles or pellets can be adjusted to tailor the available surface area as well as the tortuous nature and residence time of gas moving from the battery cell(s) and the battery casing through the inlet 40 of the condensation chambers 18a, 18b and outward through the outlet 38 to the vent aperture 16. Other media, including a porous medium, porous particle, and/or porous pellets can be used within the condensation chambers 18a, 18b without departing from the scope of the disclosure. The medium 44 can be formed from any material. For example, the medium 44 can be formed from plastic. In certain embodiments, the medium 44 includes polymeric pellets that are acid resistant and/or oxidation resistant. Other aspects of the present technology include the use of walls or protrusions extending from the inner chamber wall 42 to form a labyrinth of paths for the gases to flow through. As schematically shown, the medium 44 fills a portion of the condensation chambers 18a, 18b. However, it is understood, the medium 44 can fill an entirety of the condensation chambers 18a, 18b.

With renewed reference to FIGS. 1-5, a plurality of studs 46 can be included with the battery cover 10, wherein the studs 46 are configured to couple the battery cover 10 to the battery casing. The studs 46 align with receiving features (not shown) such as detents or holes of the battery casing. The studs 46 extend outwardly from the bottom surface 24 of the flanged portion 26. Although the studs 46 may extend from other portions of the sealing member 12, besides the flanged portion 26, depending on the alignment of the studs 46 with the battery casing. The studs 46 can be integrally formed, as shown, or separately formed from the sealing member 12. In certain embodiments, the studs 46 can be welded or heat staked to the battery casing or coupled to the battery casing by a friction fit, for example.

A lid 48 covers the vent aperture 16 and the condensation chamber 18 and engages a distal end of the inner vent wall 36 and the inner chamber wall 42. A shape of the lid 48 substantially corresponds with the cross-sectional shape of the condensation chambers 18a, 18b and the vent aperture 16. Where the lid 48 covers the vent aperture 16, the lid 48 includes a protrusion 50 visible through the vent aperture 16 from the top surface 22 of the battery cover 10. The protrusion 50 is configured as a fill height indicator for electrolyte. The protrusion 50 can be centrally located with respect to the vent aperture 16. The protrusion 50 can include indicia marking a fill level or provide a structural feature, for example, to indicate when electrolyte or water is at the top end of the protrusion 50. The lid 48 can be coupled to the walls 36, 42 forming the vent aperture 16 and the condensation chambers 18a, 18b with a plurality of studs 52 integrally formed with and extending outwardly from the inner chamber walls 42. Although, in alternate embodiments, the studs 52 can be formed separately from the inner chamber walls 42. The studs 52 engage with a plurality of holes 54 formed in the lid 48. The studs 52 can be welding or heat staked to the lid 48 or can be coupled to the lid 48 by a friction fit, if desired.

According to the present disclosure, all of the gases generated in the battery casing from the battery, including any of the entrained electrolyte vapor, are directed through the inlet 40 to the condensation chambers 18a, 18b. The gases then exit the condensations chambers 18a, 18b through the outlet 38 to the vent aperture 16 before ultimately exiting the vent aperture 16 of the battery cover 10. In the condensation chambers 18a, 18b, the electrolyte vapor condenses back into liquid to be retained inside the battery, resulting in less liquid loss from the battery due to evaporation. The flow path of the gases is restricted by the medium 44 in the condensation chambers 18a, 18b as the gases must flow between and around the medium 44. As a result, the gases contact more surface area, resulting in more of the electrolyte entrained within the gases being condensed back into liquid, compared to prior art. Battery life can therefore be optimized. The condensed electrolyte can then be returned to the battery through the inlet 40.

Advantageously, when adding the electrolyte or the water to the battery, the protrusion 50 is visible through the vent aperture 16 when the vent cap covering the vent aperture 16 is removed and provides an easy way to know when the battery is properly filled with the electrolyte. In this manner, the protrusion 50 provides an indication of the proper fill level of the electrolyte when initially assembling the battery and an indication of the proper fill level in maintaining the battery.

Also, advantageously, the studs 46, 52 not only facilitate coupling of the battery cover 10 to the battery casing and the lid 48 to the battery cover 10, respectively, but also serve as ejector pin pads to aid part ejection from a mold in which the studs 46, 52 and/or battery cover 10 is formed. Since batteries are manufactured in different sizes, the shape and size of the battery cover 10, the condensation chambers 18a, 18b, and the lid 48 can vary, as desired.

Figure 6:
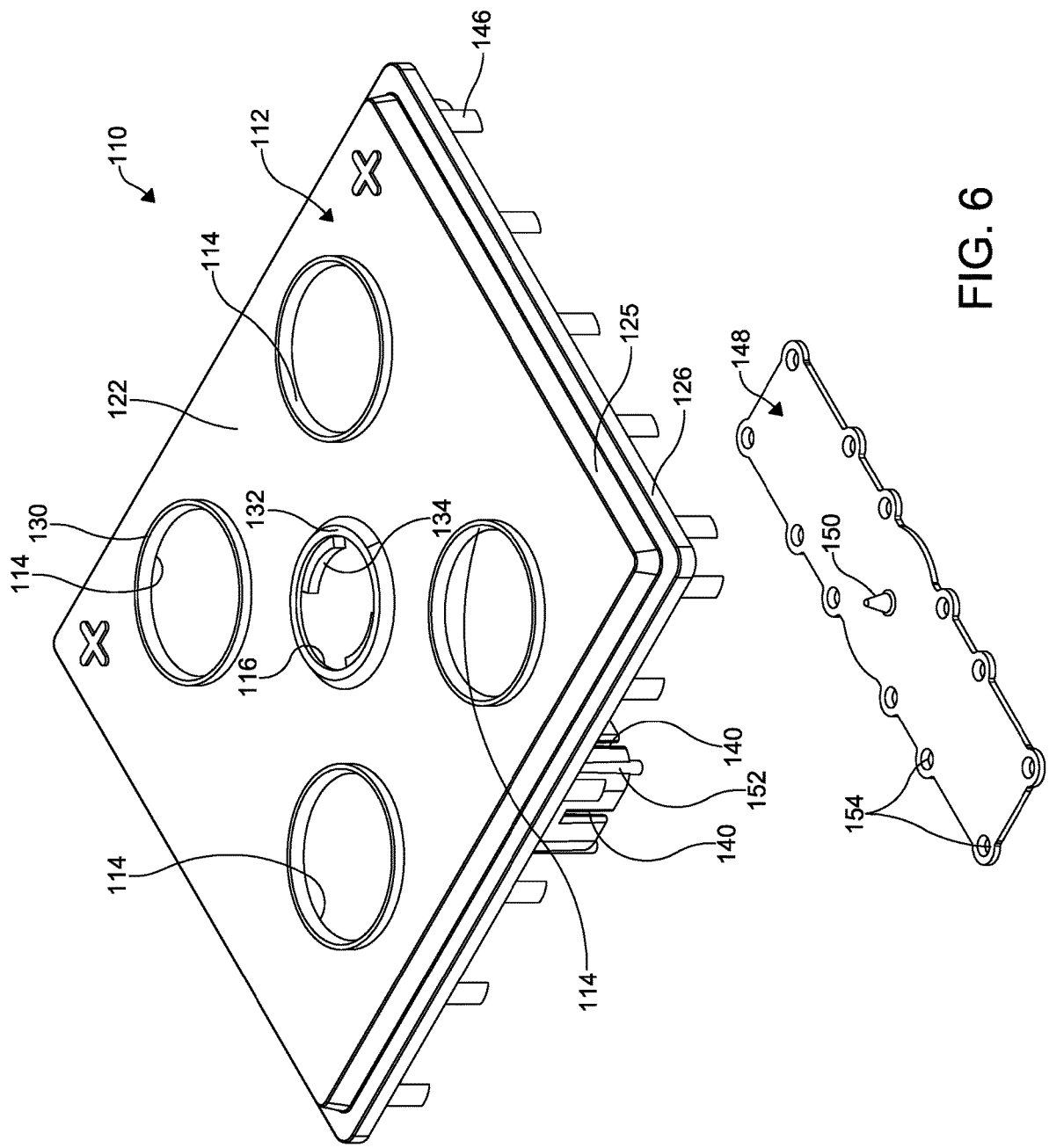
FIG. 6 illustrates an exploded top perspective view of a battery cover according to another embodiment of the disclosure.
Figure 7:
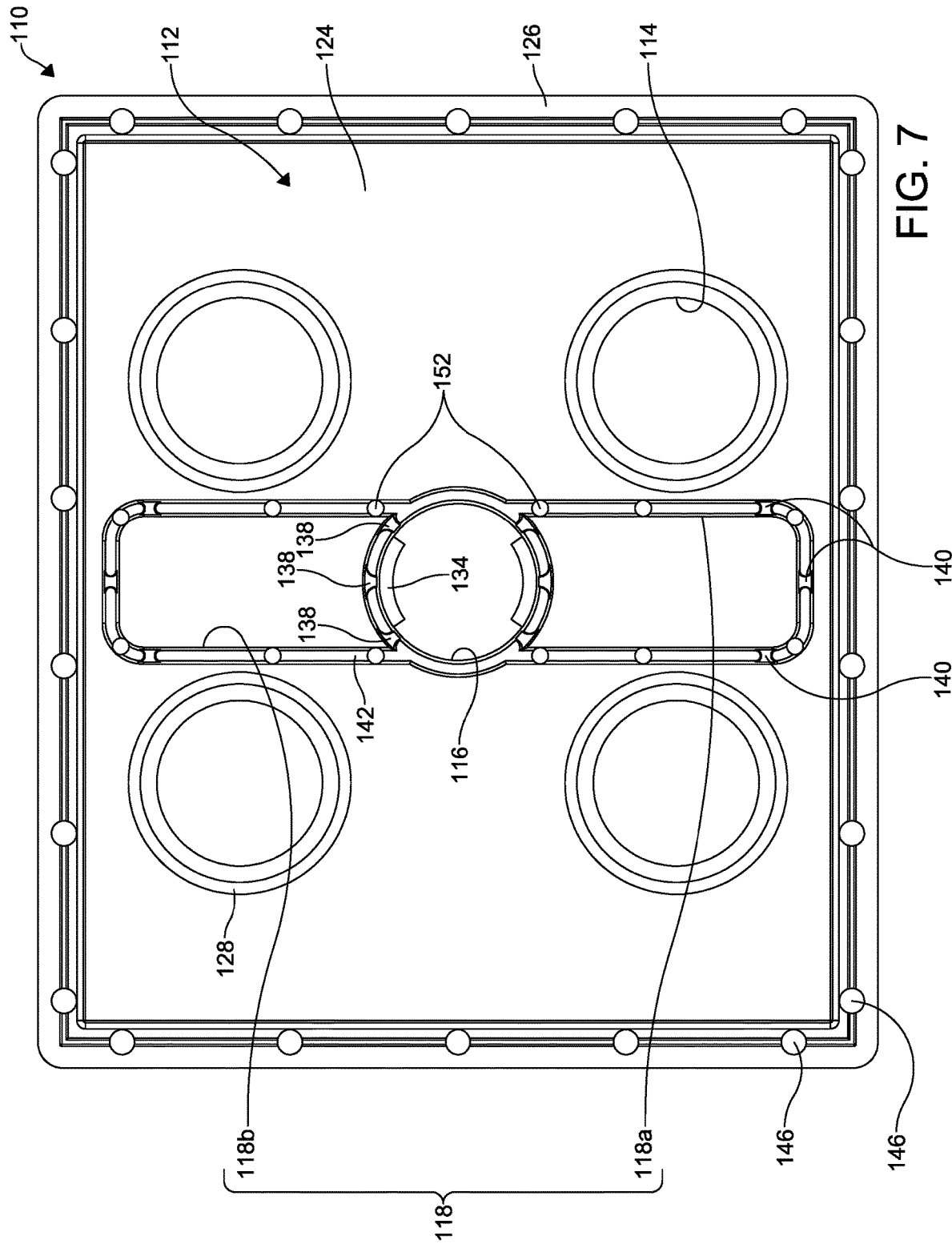
FIG. 7 illustrates a bottom plan view of the battery cover of FIG. 6 with a lid removed therefrom.

FIGS. 6-7 include a battery cover 100 according to another embodiment of the instant disclosure. Features of the battery cover 100 of FIGS. 6-7 similar to the features of the battery cover 10 of FIGS. 1-5 are referenced by the same reference numeral but with a leading one "1" for convenience. The battery cover 100 of FIGS. 6-7 is substantially the same as the battery cover 10 of FIGS. 1-5, except the battery cover 100 includes four terminal apertures 114 and a configuration of the condensation chamber 118 is different.

In the embodiment illustrated, the condensation chamber 118 is divided into the pair of condensation chambers 118a, 118b each having substantially rectangular cross-sectional shapes to accommodate for minimized spacing and area between the terminal apertures 114. While not shown, it is understood, the battery covers 10, 100 can include varying configurations and shapes of the condensation chamber 18, 118 to accommodate for the number of and spacing between the terminal apertures 14, 114 and vent apertures 16, 116.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A battery cover comprising:
   a sealing member configured to provide a fluid-tight seal with a battery casing, the sealing member having a top surface and a bottom surface;
   a vent aperture formed through the sealing member; and
   a condensation chamber disposed adjacent the bottom surface of the sealing member, wherein the condensation chamber includes an inlet fluidly coupling the condensation chamber to the battery casing and an outlet fluidly coupling the condensation chamber to the vent aperture, the condensation chamber receiving a flow of a fluid therethrough with a portion of the flow of the fluid condensing within the condensation chamber while flowing from the inlet to the outlet, wherein the inlet is further configured to allow for the portion of the flow of the fluid that has condensed within the condensation chamber to flow back into the battery casing through the inlet.

2. The battery cover of claim 1, further comprising a medium disposed within the condensation chamber, the medium having a surface area contacting the flow of the fluid through the condensation chamber.

3. The battery cover of claim 2, wherein the medium includes a plurality of particles.

4. The battery cover of claim 2, wherein the medium includes a plurality of pellets.

5. The battery cover of claim 2, wherein the medium is a plastic.

6. The battery cover of claim 1, wherein the inlet is configured as a slot and the outlet is configured as a slot.

7. The battery cover of claim 1, wherein the vent aperture and the condensation chamber are integrally formed.

8. The battery cover of claim 1, wherein the condensation chamber is divided into a plurality of condensation chambers, each of the plurality of condensation chambers fluidly coupled to the vent aperture.

9. The battery cover of claim 1, further comprising a terminal aperture formed through the sealing member and configured to receive a terminal of a battery.

10. The battery cover of claim 1, further comprising a lid covering at least a portion of the vent aperture and the condensation chamber.

11. The battery cover of claim 10, wherein the lid includes an upper surface and a protrusion projecting from the upper surface of the lid, wherein the protrusion is visible through the vent aperture, the protrusion indicating a fill level for electrolyte.

12. The battery cover of claim 10, wherein the lid is coupled to the sealing member to cover the at least the portion of the vent aperture and the condensation chamber with a plurality of studs.

13. The battery cover of claim 10, wherein the lid forms a bottom surface of the condensation chamber, and wherein the inlet is a slot formed in a wall defining a perimeter of the condensation chamber, the slot extending to the lid in order to facilitate the portion of the flow of the fluid that has condensed within the condensation chamber flowing back into the battery casing through the inlet via the force of gravity.

14. A battery cover for covering a battery casing comprising:
- a sealing member configured to provide a fluid-tight seal with the battery casing, the sealing member having a top surface, a bottom surface, a vent aperture formed therethrough, and a terminal aperture formed therethrough;
- an inner vent wall surrounding the vent aperture and extending outwardly from the bottom surface of the sealing member;
- an inner chamber wall extending outwardly from the bottom surface of the sealing member, the inner chamber wall defining a condensation chamber fluidly coupled to the vent aperture via an outlet, the condensation chamber conveying a flow of a fluid therethrough; and
- a medium disposed within the condensation chamber, wherein the condensation chamber receives the flow of the fluid from the battery casing through an inlet formed in the inner chamber wall and conveys the fluid to the vent aperture through the outlet formed in the inner vent wall, wherein the medium has a surface contacting the flow of the fluid through the condensation chamber, and wherein an electrolyte entrained within the fluid condenses on the surface area and flows back into the battery casing through the inlet formed in the inner chamber wall.

15. The battery cover of claim 14, wherein the condensation chamber is divided into a pair of condensation chambers each extending laterally outwardly from the inner vent wall.

16. The battery cover of claim 14, wherein the medium has a surface contacting the flow of the fluid through the condensation chamber, and wherein an electrolyte entrained within the fluid condenses on the surface area.

17. The battery cover of claim 14, wherein the inlet formed in the inner chamber wall is provided as a slot extending to a bottom of the inner chamber wall to facilitate the electrolyte that has condensed within the condensation chamber flowing back into the battery casing through the inlet via the force of gravity.

18. The battery cover of claim 14, wherein the inner vent wall does not surround the terminal aperture.

19. A method of retaining electrolyte in a battery comprising the steps of:
- sealing a battery casing containing the battery with a battery cover;
- venting gases released by the battery through a vent aperture formed through the battery cover;
- condensing electrolyte entrained within the gases in a condensation chamber disposed on the battery cover before the gasses exit through the vent aperture, wherein the condensation chamber includes an inlet fluidly coupling the condensation chamber to the battery casing and an outlet fluidly coupling the condensation chamber to the vent aperture with the gases flowing from the inlet to the outlet during the condensing of the electrolyte, the gases contacting a surface area of a medium disposed within the condensation chamber, wherein the inlet is further configured to allow for the condensed electrolyte to flow back into the battery casing through the inlet; and
- determining a size of the surface area of the medium dependent on the amount of electrolyte necessitating retainment within the battery.

20. The method of claim 19, further comprising the step of indicating a level of electrolyte within the battery through the vent aperture with a protrusion extending through the vent aperture.

* * * * *